US009338825B2

(12) United States Patent
Bulgajewski et al.

(10) Patent No.: US 9,338,825 B2
(45) **Date of Patent: *May 10, 2016**

(54) COMBINATION SEAT HEATER AND OCCUPANT SENSOR ANTENNA

(71) Applicant: Illinois Tool Works, Glenview, IL (US)

(72) Inventors: Edward F. Bulgajewski, Benoa, IL (US); Michael M. Cuban, Park Ridge, IL (US); Piotr Sliwa, Mt. Prospect, IL (US)

(73) Assignee: Illinois Tool Works Inc., Glenview, IL (US)

( * ) Notice: Subject to any disclaimer, the term of this patent is extended or adjusted under 35 U.S.C. 154(b) by 276 days.

This patent is subject to a terminal disclaimer.

(21) Appl. No.: 13/841,127

(22) Filed: Mar. 15, 2013

(65) Prior Publication Data

US 2013/0213950 A1 Aug. 22, 2013

Related U.S. Application Data

(63) Continuation-in-part of application No. 13/132,351, filed as application No. PCT/US2009/065871 on Nov. 25, 2009.

(60) Provisional application No. 61/119,511, filed on Dec. 3, 2008, provisional application No. 61/226,879, filed on Jul. 20, 2009, provisional application No. 61/613,176, filed on Mar. 20, 2012.

(51) Int. Cl.

| | |
|---|---|
| ***B60L 1/02*** | (2006.01) |
| ***H05B 1/00*** | (2006.01) |
| ***H01P 3/00*** | (2006.01) |
| ***H01Q 1/22*** | (2006.01) |
| ***H05B 3/34*** | (2006.01) |

(52) U.S. Cl.

CPC .. *H05B 1/00* (2013.01); *H01P 3/00* (2013.01); *H01Q 1/22* (2013.01); *H05B 3/34* (2013.01); *H05B 2203/003* (2013.01); *H05B 2203/013* (2013.01); *H05B 2203/029* (2013.01)

(58) Field of Classification Search

CPC ....... H05B 1/00; H05B 1/0236; H05B 1/0238
USPC .................. 219/202, 207, 212, 217, 518, 528
See application file for complete search history.

(56) References Cited

U.S. PATENT DOCUMENTS

| | | | | |
|---|---|---|---|---|
| 6,559,555 | B1 * | 5/2003 | Saitou | B60N 2/002 280/735 |
| 7,134,715 | B1 * | 11/2006 | Fristedt et al. | 297/180.12 |
| 7,202,444 | B2 * | 4/2007 | Bulgajewski | 219/217 |
| 7,205,510 | B2 * | 4/2007 | Howick | B60N 2/5685 219/217 |
| 7,306,283 | B2 * | 12/2007 | Howick et al. | 297/180.12 |
| 7,663,378 | B2 | 2/2010 | Ito et al. | |
| 2004/0021346 | A1 * | 2/2004 | Morinet et al. | 297/180.12 |

* cited by examiner

*Primary Examiner* — Dana Ross
*Assistant Examiner* — Ayub Maye

(57) ABSTRACT

A combination automobile seat heater and occupant sensor antenna is provided having a flexible substrate with the seat heater applied on one side of the substrate and the occupant sensor antenna applied on the other side of the substrate. Structure is provided to minimize interference in the performance of the antenna by operation of the seat heater, which can include advantageous positioning of the layers and/or the use of a layer defining air gaps between the seat heater and occupant sensor.

15 Claims, 8 Drawing Sheets

COMBINATION SEAT HEATER AND OCCUPANT SENSOR ANTENNA

CROSS-REFERENCE TO RELATED APPLICATIONS

The present application claims the benefits of U.S. Provisional Application Ser. No. 61/613,176 filed on Mar. 20, 2012; and is a continuation-in-part of co-pending U.S. patent application Ser. No. 13/132,351 filed Jun. 2, 2011; which is a national phase filing of PCT/US2009/065871 filed on Nov. 25, 2009 and which claims the benefits of U.S. Provisional Application Ser. No. 61/119,511 filed Dec. 3, 2008 and the benefits of U.S. Provisional Application Ser. No. 61/226,879 filed Jul. 20, 2009.

FIELD OF THE INVENTION

The present invention relates to seat heaters and to occupant sensor systems for automobiles and, more particularly to structures having combined components for a seat heater and an occupant sensor.

BACKGROUND OF THE INVENTION

Various types of seat heaters have been used in automobiles to heat occupied seats and improve passenger comfort. A vehicle seat heater is required to be strong and durable to accommodate bending without stretching to maintain integrity of the conductor traces comprising the heater. It is known to provide a self-regulating heater on a flexible substrate that can withstand flexing and temperature variations and resist moisture. Exemplary automobile seat heaters can be found, for example, in U.S. Pat. Nos. 6,884,965 and 7,202,444. The seat heaters disclosed therein can be made by polymer thick film printing processes, which are known to those skilled in the art.

Occupant sensors have been incorporated into automobile passenger compartments for determining when a seat is occupied and alerting passengers if seatbelts are not fastened for all occupants. In more sophisticated occupant sensor systems, vehicle air bags can be activated or deactivated based on sensed occupancy. Deployment characteristics of an airbag system may be controlled and changed based on the sensed mass of the occupant, to operate differently for children or smaller adults than for larger occupants. Different types of sensor systems have been used. Some occupant sensor systems discriminate only on differences in mass and do not distinguish between, for example, a small child and an object of similar mass placed on the seat. A more sophisticated occupant sensor technology, referred to herein as a capacitor system, utilizes electric field imaging technology to determine occupancy and distinguish between human occupants and other articles or things that may be placed on a vehicle seat. A flexible antenna is placed in the automobile seat and operates as one plate spaced from a second plate defined by the roof of the vehicle, the windshield or other structure to establish charge separation in a parallel plate capacitor creating an internal electric field. A polarized dielectric interposed between the spaced plates reduces the electric field and increases the capacitance. By sensing capacitance changes that occur when a person or thing is positioned between the plates, and comparing to the known capacitance of air between the antenna and plate, software can discriminate between persons and things, and can evaluate the size of a person occupying the seat. A controller can then use the information obtained from the sensor to provide operating signals for controlling various systems that interact with the occupants.

It is known to provide seat heaters and occupant sensors as separate individual systems. Installation of the separate individual components of each system can be both difficult and time consuming. It is also known to provide intra-seat structures that combine components for seat heater and occupant sensing systems of some types, such as that shown in U.S. Pat. No. 7,500,536 which utilizes a self-regulating heater and a mass sensor. However, it has not been known to combine the more sophisticated capacitor system occupant sensors with seat heaters due to interference generated in the performance of capacitor system sensor by operation of the seat heater. Even providing these systems as separate individual components in a seat has been difficult, due to the interference problem.

It would be advantageous to combine in a single seat structure both a self-regulating heater component and an antenna for an occupant sensor capacitor system.

SUMMARY OF THE INVENTION

The present invention provides a combined structure having a self-regulating heater and an antenna for an occupant sensor capacitor system on opposite sides of a common substrate.

In one aspect of one form thereof, a combination seat heater and occupant sensor antenna is provided with an electrically insulative substrate having opposed first and second sides, a seat heater assembly applied to the first side of the substrate, a capacitor system occupant sensor antenna applied to the second side of the substrate, and interference reducing structure interposed between the seat heater assembly and the antenna, which includes a layer defining air gaps.

An advantage obtained from one embodiment of the present invention, in one form thereof, is supplying a single unit or structure incorporating components for both an automobile seat heater and a capacitor system vehicle occupant sensor, thus saving material costs and promoting installation efficiency over designs having separate, individual components for heater and occupant sensor systems.

Another advantage obtained from an embodiment of a form of the present invention is providing a versatile installation having an antenna that can be used for various functions in systems interacting with vehicle occupants.

Still another advantage obtained from an embodiment of the present invention in a form thereof is providing a combination seat heater and occupant sensor antenna for a capacitor system type occupant sensor in which interference with occupant sensor performance from operation of the seat heater is reduced effectively.

A further advantage of the invention is providing a method for making a combination seat heater and occupant sensor antenna that promotes efficiency and reliability Other features and advantages of the invention will become apparent to those skilled in the art upon review of the following detailed description, claims and drawings in which like numerals are used to designate like features.

Figure 1:
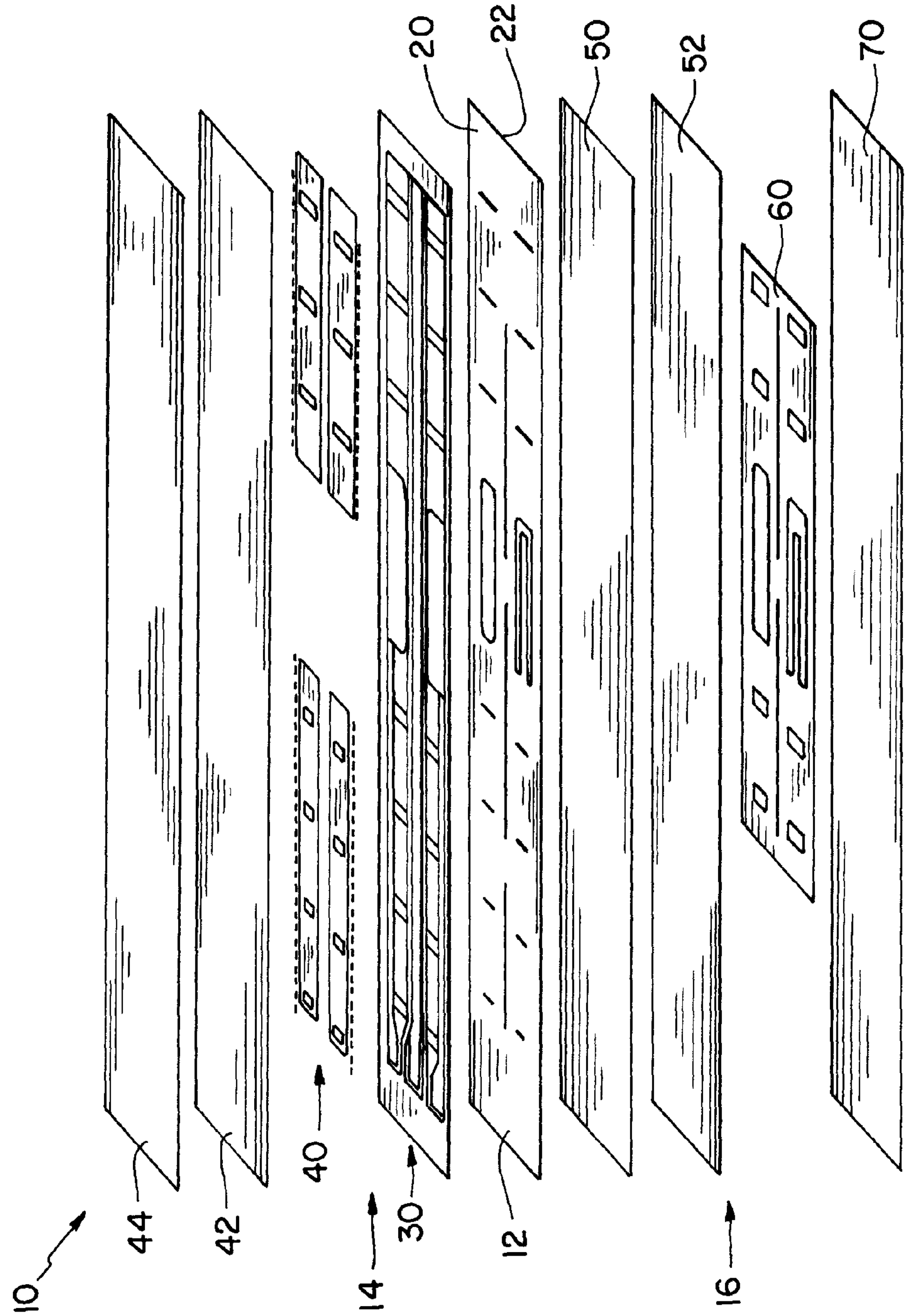
FIG. 1 is an exploded, schematic view of a combination seat heater and occupant sensor antenna.
Figure 2:
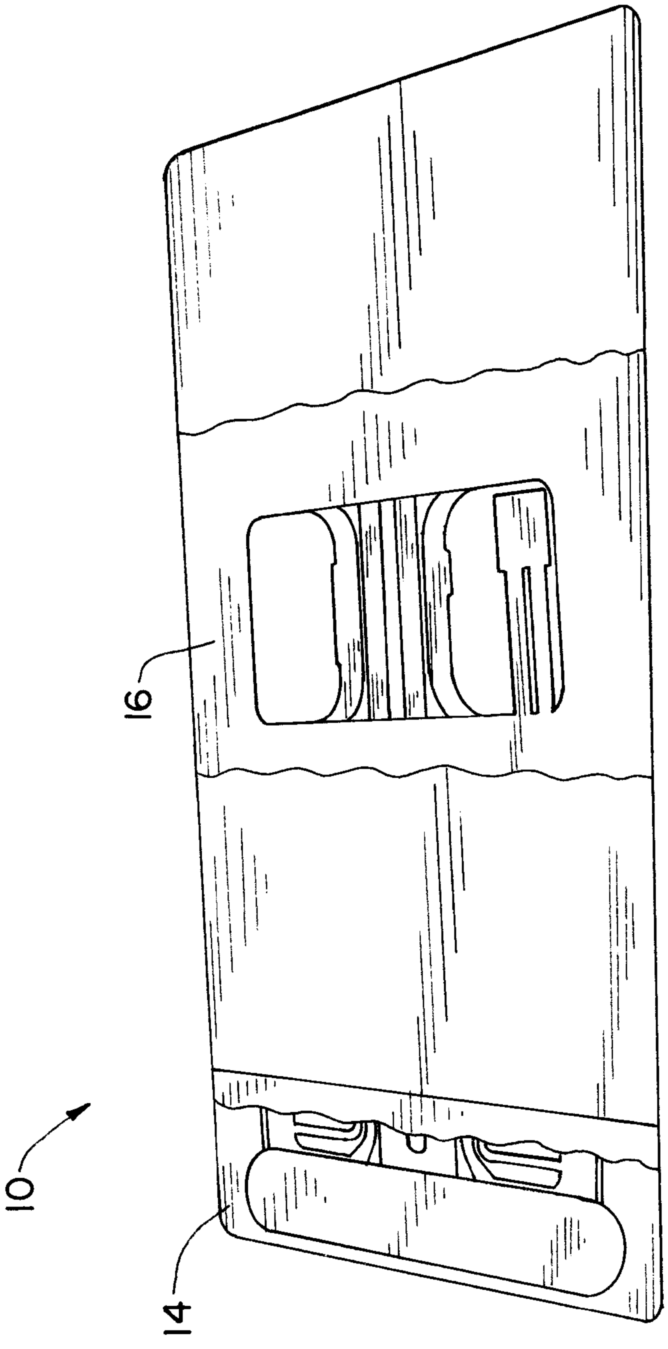
FIG. 2 is a perspective view, partially cutaway, of a combination seat heater and occupant sensor antenna.
Figure 3:
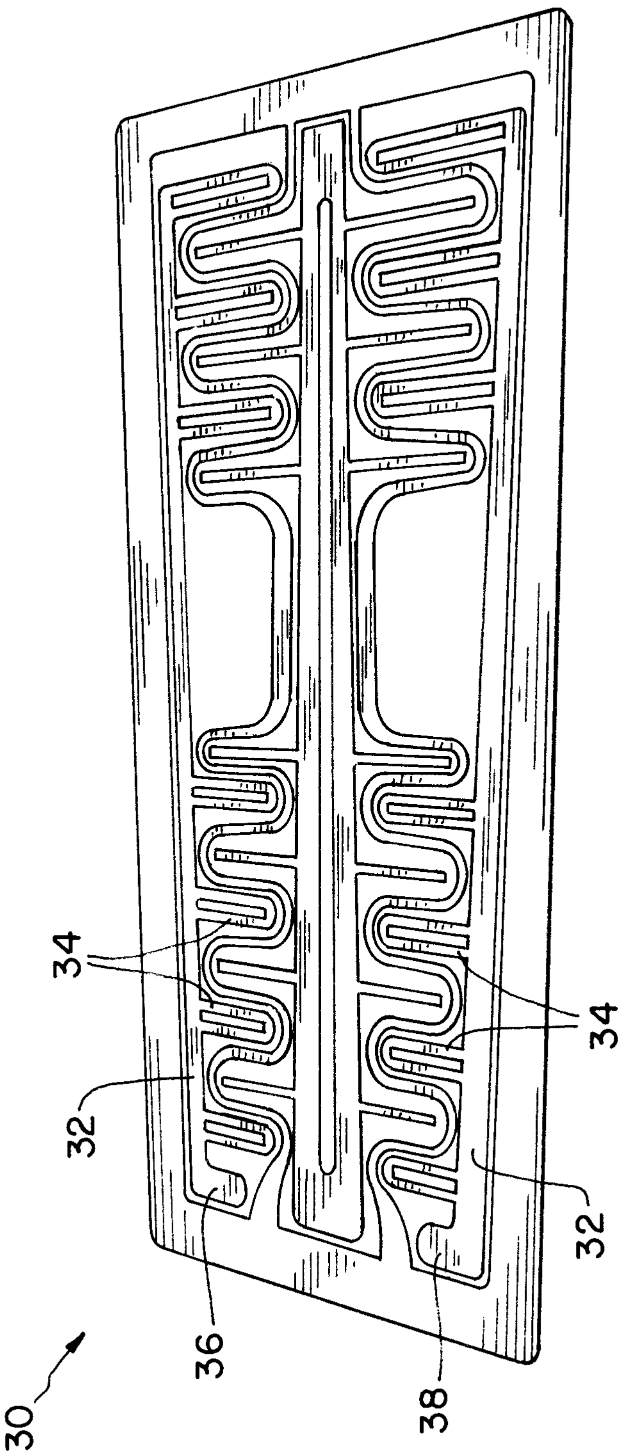
FIG. 3 is a perspective view of a seat heater in a combination seat heater and occupant sensor antenna.
Figure 4:
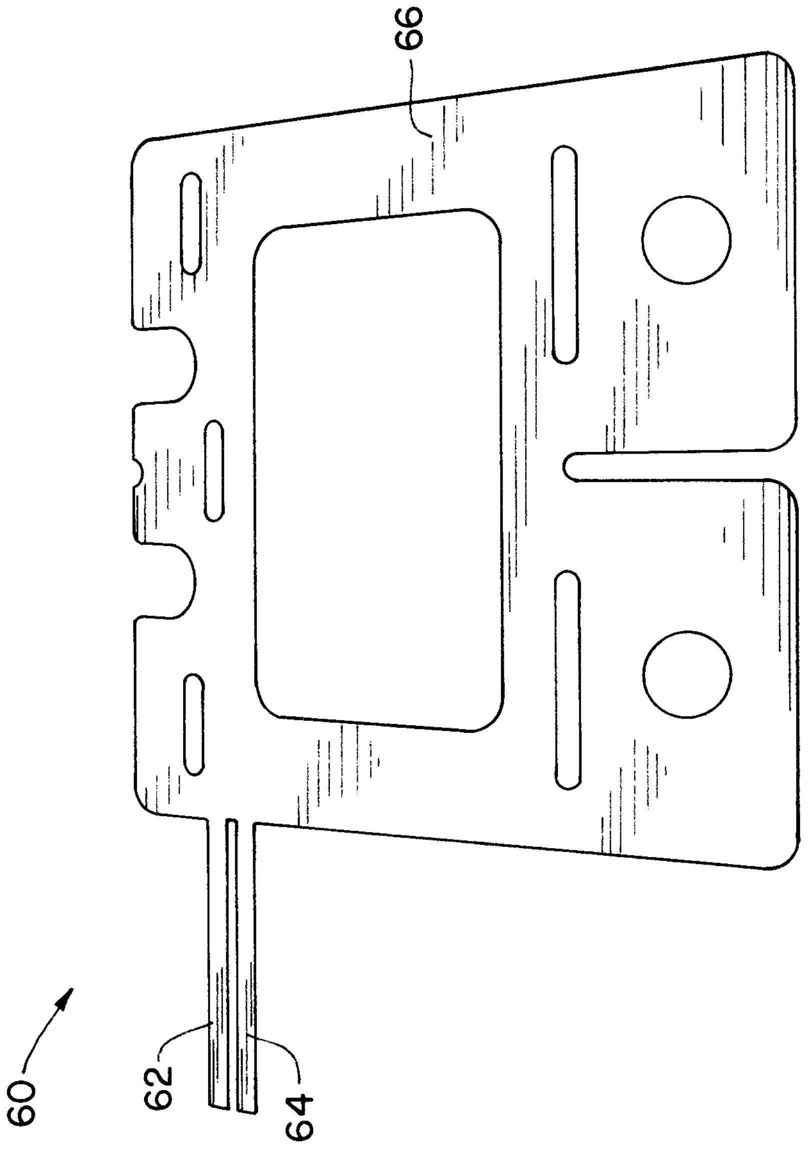
FIG. 4 is a perspective view of an occupant sensor antenna in a combination seat heater and occupant sensor antenna.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more particularly to the drawings, numeral 10 designates a combination seat heater and occupant sensor antenna in accordance with the present invention. Combination seat heater and occupant sensor antenna 10 includes a substrate 12 having a seat heater assembly 14 applied on a first side thereof and an occupant sensor antenna assembly 16 applied on an opposite, second side thereof, the antenna being for a capacitance occupant sensor system. Each seat heater assembly 14 and antenna assembly 16 can be applied on substrate 12 by polymer thick film screen printing or other suitable application process, such as laminating processes.

Substrate 12 is a polymer sheet of insulative material such as, for example, polyester such as Mylar®. Substrate 12 is strong, yet flexible and has opposed surfaces 20, 22 on which heater assembly 14 and occupant sensor system antenna assembly 16 are applied. Substrate 12 is provided of suitable size and shape to be installed in and provide support to heater assembly 14 for heating the desired area of an automobile seat.

In a preferred embodiment thereof, heater assembly 14 is a self-regulating heater providing less heat and drawing less current as the temperature thereof increases, and providing more heat and drawing more current at lower temperatures. Heater assembly 14 includes a conductive layer 30 of screen printed silver or the like forming a number of conductive busses 32, conductive traces 34 and electrical connection terminals 36, 38 for supplying operating current to the heater. A resistive layer 40 of carbon or the like is applied on conductive layer 30 to provide consistent heat distribution across the surface of heater assembly 14. Resistive layer 40 may include a positive temperature coefficient material to provide increasing resistance as temperatures increase, thereby providing a self-regulating heater. Alternatively, a resistive layer of fixed resistance connected to an electronic controller to regulate the heat level also can be used. Resistive layer 40 may comprise a single segment of resistive material or may comprise a plurality of discrete segments applied to selected areas of conductive layer 30.

The manner of making and structure for a suitable heater assembly 14, including the structures of conductive layer 30 and resistive layer 40 thereof are well-known to those skilled in the art, and may take various forms, shapes and configurations beyond that specific embodiment shown for exemplary purposes in the drawings. For example, various cutouts and voids can be created both to conform to the seat in the desired areas of heating as well as to provide adequate flexibility and resiliency in the final structure.

The heater side of combination seat heater and occupant sensor antenna 10 can be completed with an adhesive layer 42 on top of heater assembly 14 and a fabric layer 44 adhered to adhesive layer 42. Adhesive layer 42 can be a contact or pressure sensitive adhesive or other suitable adherent between heater assembly 14 and fabric layer 44. Fabric layer 44 may be, for example, a low stretch polyester or other suitable fabric for covering and protecting seat heater assembly 14.

In the exemplary embodiment shown, occupant sensor antenna assembly 16 includes multiple layers applied to substrate 12 on the opposite side from seat heater assembly 14. A first layer adjacent substrate 12 is a ground plane conductor layer 50 applied to substrate 12, and may comprise a polymer thick film screen printed layer, a solid layer of silver, a metalized foil laminate or other suitable electric ground layer. Alternatively, a metalized Mylar® sheet, or a metal sheet can be used for ground plane conductor layer 50 applied to substrate 12 by a metalized adhesive or other suitable laminating process instead of screen printing.

An electrical isolation layer 52 is applied on ground plane conductor layer 50. Isolation layer 52 is a printed dielectric that may be applied by the aforementioned polymer thick film screen printing techniques. Other materials applied via other processes, such as laminating, also can be used. Dielectric isolation layer 52 provides electrical isolation between ground plane 50 and a conductive antenna layer 60. Dielectric isolation layer 52 prevents shorting between ground plane 50 and antenna layer 60. Accordingly, dielectric isolation layer 52 should have suitable thickness to provide sufficient strength and flexibility without breaking.

Antenna layer 60 is part of a capacitor system occupant sensor and comprises a conductive layer applied to dielectric isolation layer 52. For example, antenna layer 60 can be formed from silver printed in a desired configuration, and can include circuitry connections 62, 64 connected to an antenna body or plate 66. The size and shape of plate 66 can vary from one application and use of the present invention to another.

Ground plane conductor layer 50 and dielectric isolation layer 52 can be provided of similar size, shape and configuration to antenna layer 60. Alternatively, ground plane conductor layer 50 and dielectric isolation layer 52 can be provided of some size larger than antenna layer 60 and may be applied to substantially the entire dimension of second surface 22 of substrate 12. Other types of barrier and/or isolation layers can be provided between seat heater assembly 14 and occupant sensor antenna 60 to minimize potential interference in the function of the antenna caused by operation of the seat heater. For example, the thickness and composition of substrate 12 can be selected to reduce potential interference in cooperation with or in place of discrete ground plane and dielectric isolation layers interposed between the substrate and antenna.

The antenna assembly side of combination seat heater and occupant sensor antenna 10 may further include an adhesive layer 70 by which combination seat heater and occupant sensor antenna 10 can be adhered to a foam pad or other seat structure in which combination seat heater and occupant sensor antenna 10 will be used. Other external sealing and/or protective layers can be provided on either side or both sides of combination seat heater and occupant sensor antenna 10.

Those skilled in the art will understand that heaters, antennas and other conductive layers described herein may include electrical conductors that are made from a conductive metal such as copper, silver, gold, aluminum, carbon, or graphitic materials. It is further known that the conductive material used as the electrical conductors may be made of very small flakes of material in a polymer matrix. If this material is caused to be over-stretched or subject to repeated stretching, the conductive layer may crack, thereby resulting in undesirable arcing. To help alleviate potential cracking, apertures may be provided in and through the various layers described above, including substrate 12. The apertures may include holes, rectangular cutouts or irregular cutouts as necessary to promote desired bending at desired locations. The apertures may extend between multiple layers in the same size, shape and configuration; or the apertures may vary in size, shape and configuration from one layer to another layer.

Figure 5:
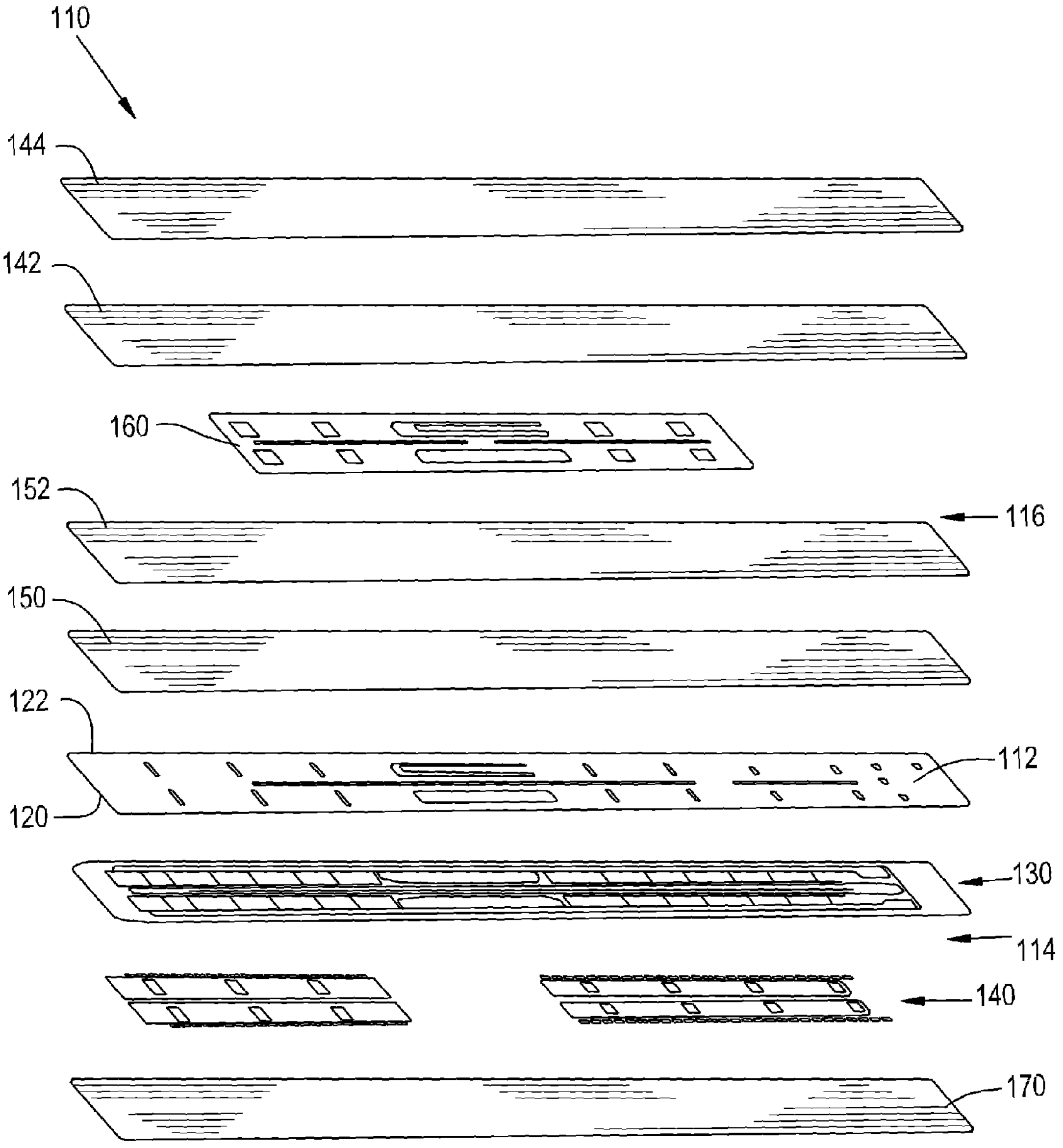
FIG. 5 is an exploded, schematic view of a combination seat heater and occupant sensor antenna of another embodiment.

It should be understood that the various layers described previously herein also can be arranged in other ways. For example, in some applications and uses for a combination seat heater and occupant sensor it may be advantageous to place the antenna layer above the heater, to further reduce interference in the operation of the antenna. In FIG. 5, a combination seat heater and occupant sensor antenna 110 is shown, which is similar to combination seat heater and occupant sensor antenna 10 shown and described previously herein, except for the positions of the various layers. Accordingly, structures in FIG. 5 that are similar to structures described previously herein are numbered similarly to corresponding structures in the previous drawings, albeit in the "100" series of numbers. Seat heater and occupant sensor 110 shown in FIG. 5 includes a substrate 112 having first and second sides 120, 122; substrate 112 being similar to substrate 12 described previously herein. A seat heater assembly 114 includes a conductive layer 130 and a resistive layer 140 on a bottom side of substrate 112, which are similar to the previously described heater assembly 14, conductive layer 30 and resistive layer 40, respectively. An occupant sensor antenna assembly 116 on the top side of substrate 112 includes a ground plane conductor layer 150, a dielectric isolation layer 152, and an antenna layer 160, all as described previously herein with respect to occupant sensor antenna assembly 16, including ground plane conductor layer 50, dielectric isolation layer 52, and antenna layer 60. In the embodiment of FIG. 5, and adhesive layer 142 similar to adhesive layer 42 and a fabric layer 144 similar to fabric layer 44 are provided adjacent antenna layer 160. An adhesive layer 170, which is similar to adhesive layer 70, is provided on seat heater assembly 114. Adhesive layer 170 can be used to adhere seat heater and occupant sensor 110 to a foam pad or other seat structure in which seat heater and occupant sensor 110 is installed. Adhesive layer 142 and fabric layer 144 generally cover the assembly on the upper surface thereof. Accordingly, occupant sensor antenna assembly 116 is positioned above seat heater assembly 114 to minimize interference in the operation and performance of sensor antenna assembly 116 by the operation of seat heater assembly 114.

Figure 6:
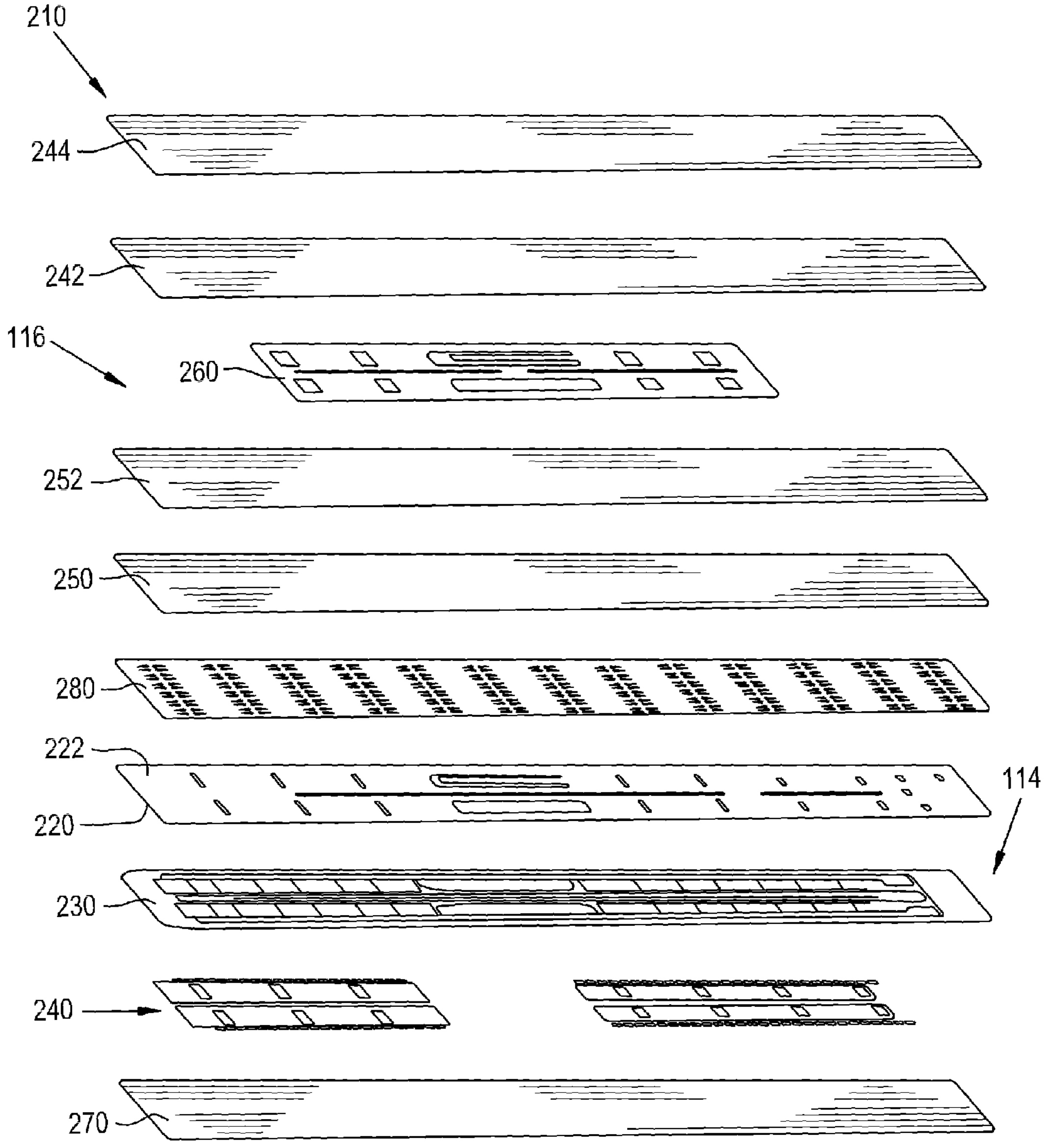
FIG. 6 is an exploded, schematic view of a combination seat heater and occupant sensor antenna of still another embodiment.
Figure 7:
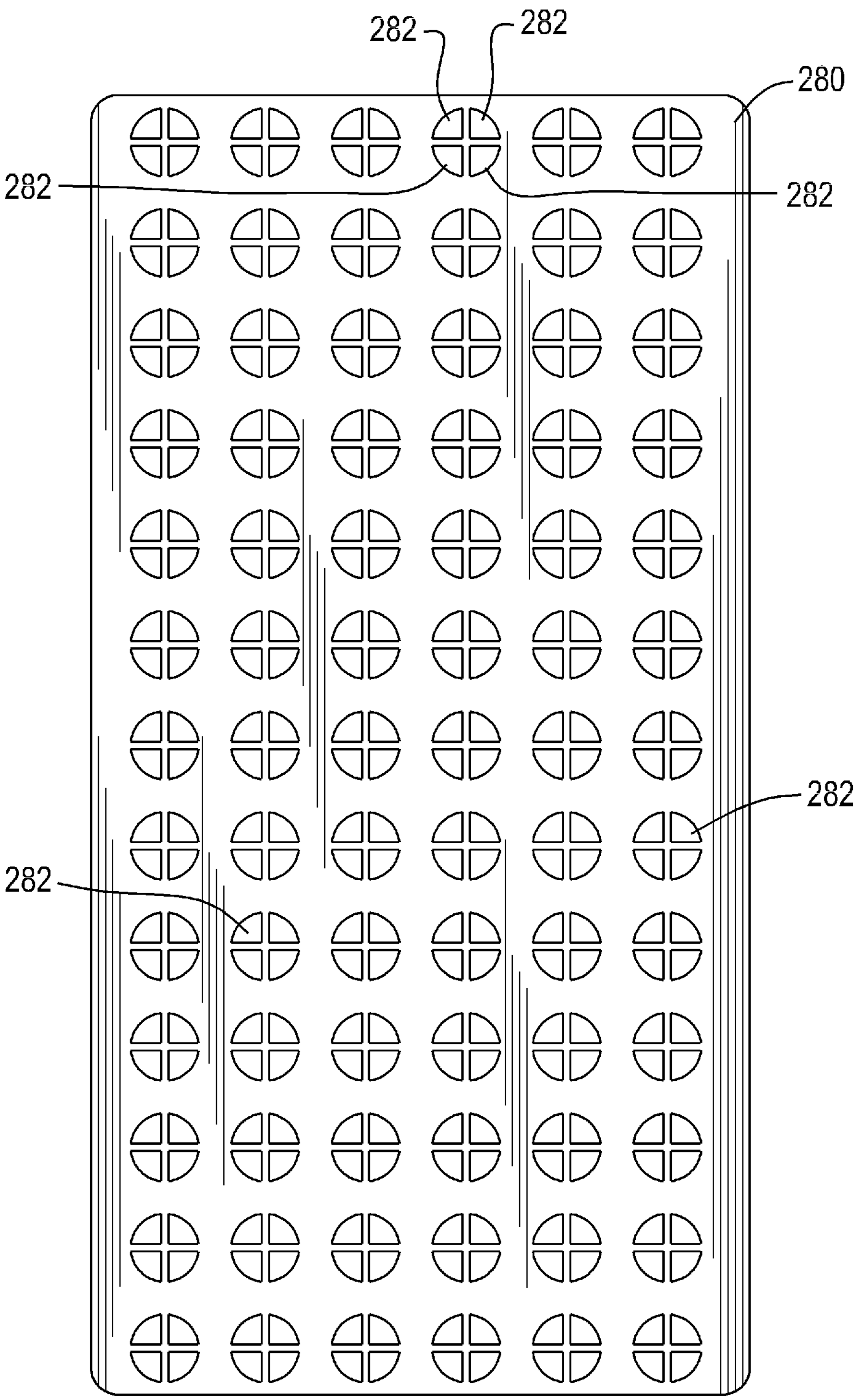
FIG. 7 is a perspective view of one layer of the combination seat heater and occupant sensor antenna shown in FIG. 6.

In some situations, a heater layer may create an electrical field that can interfere with the antenna sensor layer such that the use of a ground plane as described herein and/or the advantageous positioning of the antenna sensor above the heater assembly as described with respect to FIG. 5 will reduce, but may not eliminate, the field signal to ground. In such a situation, a portion of the electrical field from the heater layer can still interfere with the antenna signal. FIGS. 6 & 7 illustrate a further embodiment that addresses those situations. In FIG. 6, a combination seat heater and occupant sensor antenna 210 is shown, which is similar to combination seat heater and occupant sensor antenna 110 shown and described previously herein, except for an additional layer to be described subsequently herein. Accordingly, structures in FIG. 6 that are similar to structures described previously herein are numbered similarly to corresponding structures in the previous drawings, albeit in the "200" series of numbers. A seat heater and occupant sensor 210 shown in FIG. 6 includes a substrate 212 having first and second sides 220, 222. On one side of substrate 212, a seat heater assembly 214 includes a conductive layer 230 and a resistive layer 240, with an adhesive layer 270 thereon, all as described previously herein with respect to substrates 12, 112, seat heater assemblies 14, 114 including conductive layers 30, 130; resistive layers 40, 14 and adhesive layers 70, 170. On the opposite side of substrate 212, an occupant sensor antenna assembly 216 includes a ground plane conductor layer 250, a dielectric isolation layer 252 and an antenna layer 260, with an adhesive layer 242 and a fabric layer 244 thereon; all as described previously herein with respect to occupant sensor antenna assemblies 16, 116 including ground plane conductor layers 50, 150; dielectric isolation layers 52, 152; antenna layers 60, 160 thereof; and adhesive layers 42, 142 and fabric layers 44, 144.

The combination seat heater and occupant sensor antenna 210 shown in FIG. 6 further includes a so-called "air gap" layer 280 disposed between substrate 212 and ground plane conductor layer 250 of occupant sensor antenna assembly 216. Air gap layer 280 can be formed of different materials of varying thickness to define air spaces between seat heater assembly 214 and occupant sensor antenna assembly 216. FIG. 7 illustrates one suitable air gap layer 280, which is, for example, a polyester layer of 4 mil thickness having a pattern of quarter-circle or pie-shaped cutouts 282. Only some cutouts 282, and not all cutouts 282, have been designated with a reference number in FIG. 7. It should be understood that other patterns of cutouts 281, and/or cutouts of different shapes can be used to define greater or lesser overall open areas in an air gap layer. Cutouts of different sizes, shapes and concentrations can be used. Air gap layer 280 establishes a further barrier between heater assembly 214 and occupant sensor antenna assembly 216 so that any electrical field created by heater assembly 214 is less likely to cause performance altering interference with the operation of occupant sensor antenna assembly 216.

Figure 8:
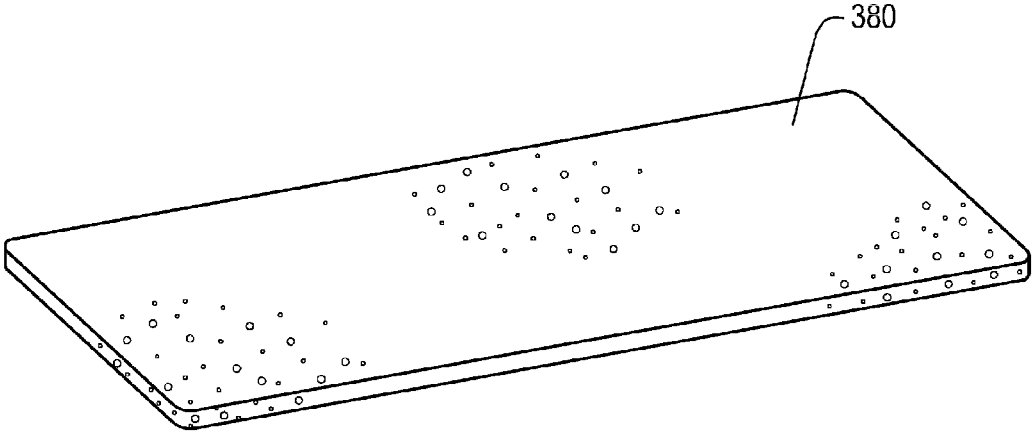
FIG. 8 is a perspective view of an alternative layer to that shown in FIG. 7 for the combination seat heater and occupant sensor antenna of FIG. 6.

It should be further understood that other materials can be used for the air gap layer. By way of further example, FIG. 8 shows an air gap layer 380 made of a foam material. Foams of different types and densities can be used.

The embodiment of a combination seat heater and occupant sensor antenna shown in FIG. 5 and that shown in FIGS. 6-8 provide similar advantages to the combination seat heater and occupant sensor antenna shown and described previously with respect to FIGS. 1-4, while further reducing potential interference in the operation of the occupant sensor antenna assemblies thereof. A single unit serves two purposes at a reduced cost. Assembly costs are reduced. The structure is compatible with current sensor technologies in the industry. The occupant sensor antenna assembly can be used for various applications upon vehicle entry or exit and can be coordinated to operate with various other remote control devices in an automobile. The assembly can be provided in various shapes and sizes as required.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A combination seat heater and occupant sensor antenna, comprising, a single structure incorporating components providing:

an electrically insulative substrate extending generally along a plane and having a first side and a second sides also extending along the plane with the first side on an opposite side of the substrate with respect to the second side;

a seat heater assembly on said first side of said substrate and having terminals for receiving a current from an automobile electrical system to provide a resistive heating of heater conductors of the seat heater assembly at a temperature adapted to provide heat to an individual seated on the combination seat heater and occupant sensor in an automotive seat;

a capacitor system occupant sensor antenna on said second side of said substrate providing an antenna layer with an antenna conductor and having connections for communication between the antenna conductor and a controller and adapted to allow sensing capacitance affected by an individual seated on the combination seat heater and occupant sensor to determine a presence or absence of an individual seated on the combination seat heater and occupant sensor; and interference reducing structure separate from the substrate interposed between said seat heater assembly and said capacitor system occupant sensor antenna adapted to electrically shield the capacitor system occupant sensor antenna from the seat heater assembly, include a generally planar layer of electrically insulating polymer material positioned and sized to fully separate the electrically insulative substrate of the seat heater from the antenna conductor and defining a plurality of air gaps therein, the air gaps distributed over the entire area of the electrically insulating polymer material separating the electrically insulative substrate of the seat heater from the antenna conductor and positioned between the antenna conductors and the heater conductors.

2. The combination seat heater and occupant sensor antenna of claim 1, said interference reducing structure including a conductive ground plane layer separate from the layer of electrically insulating polymer material having a plurality of air gaps and being substantially continuous and adjacent said layer defining air gaps and electrically isolated from the antenna conductors, the conductive ground plane layer adapted to provide an electrical ground potential.

3. The combination seat heater and occupant sensor antenna of claim 1, said layer defining air gaps therein including a plurality of cutouts.

4. The combination seat heater and occupant sensor antenna of claim 1, said layer defining air gaps therein being a foam material.

5. The combination seat heater and occupant sensor antenna of claim 2, said layer defining air gaps therein being disposed between said substrate and said ground plane layer.

6. The combination seat heater and occupant sensor antenna of claim 5, said layer defining air gaps therein including a plurality of cutouts.

7. The combination seat heater and occupant sensor antenna of claim 5, said layer defining air gaps therein being a foam material.

8. The combination seat heater and occupant sensor antenna of claim 3, said interference reducing structure including a ground plane layer adjacent said layer defining air gaps.

9. The combination seat heater and occupant sensor antenna of claim 4, said interference reducing structure including a ground plane layer adjacent said layer defining air gaps.

10. A combination seat heater and occupant sensor antenna, comprising, a single structure incorporating comments providing:

an electrically insulative substrate extending generally along a plane and having a first side and a second sides also extending along the plane with the first side on an opposite side of the substrate with respect to the second side;

a polymer thick film printed seat heater including a heater printed conductive layer and a heater printed resistive layer said first side of said substrate, said seat heater conductive layer defining a plurality of conductive traces adapted for receiving current from the automotive electrical system to provide a resistive heating of the heater printed resistive layer at a temperature to provide heat to an individual seated on the combination seat heater and occupant sensor antenna;

a polymer thick film printed capacitor system occupant sensor antenna including an antenna printed conductive layer on the second side of said substrate adapted to allow sensing capacitance affected by an individual seated on the combination seat heater and occupant sensor to determine a presence or absence of an individual seated on the combination seat heater and occupant sensor; and an air gap layer disposed between said occupant sensor antenna and said seat heater, the air gaps positioned for spacing the heater printed resistive layer from the antenna printed conductive layer wherein the air gap layer is an insulating polymer material positioned and sized to fully separate the occupant sensor antenna and the seat heater and defining a plurality of air gaps distributed over the entire area of the electrically insulating polymer material between the occupant sensor antenna and the seat heater.

11. The combination seat heater and occupant sensor antenna of claim 10, said air gap layer including a plurality of cutouts.

12. The combination seat heater and occupant sensor antenna of claim 10, said air gap layer being a foam material.

13. The combination seat heater and occupant sensor antenna of claim 10, including a ground plane layer adjacent said air gap layer.

14. The combination seat heater and occupant sensor antenna of claim 13, said air gap layer including a plurality of cutouts.

15. The combination seat heater and occupant sensor antenna of claim 13, said air gap layer being a foam material.

* * * * *